United States Patent [19]

Ohtomi

[11] Patent Number: 5,085,556
[45] Date of Patent: Feb. 4, 1992

[54] INDUSTRIAL ROBOT APPARATUS

[75] Inventor: Sadayuki Ohtomi, Inazawa, Japan

[73] Assignee: Mitsubishi Denki K.K., Tokyo, Japan

[21] Appl. No.: 536,868

[22] Filed: Jun. 12, 1990

[30] Foreign Application Priority Data

Jun. 14, 1989 [JP] Japan ................... 1-149535

[51] Int. Cl.⁵ .................................. B25J 9/00
[52] U.S. Cl. ........................... 414/744.3; 414/744.5; 414/744.6; 414/799; 901/18
[58] Field of Search ............... 414/4, 718, 728, 744.1, 414/744.2, 744.3, 744.4, 744.5, 744.6, 799; 901/15, 18, 24, 27, 30

[56] References Cited

U.S. PATENT DOCUMENTS

| | | | |
|---|---|---|---|
| 3,661,051 | 10/1972 | Dunne et al. | 901/22 X |
| 4,501,522 | 2/1985 | Causer et al. | 901/18 X |
| 4,547,121 | 10/1985 | Nesmith | 414/718 X |
| 4,630,992 | 12/1986 | Gilli et al. | 901/17 |
| 4,725,191 | 2/1988 | Eberle et al. | 414/744.5 |
| 4,850,782 | 7/1989 | Focke | 414/744.3 X |
| 4,978,274 | 12/1990 | de Groot | 414/744.3 |

FOREIGN PATENT DOCUMENTS

| | | |
|---|---|---|
| 0082386 | 6/1983 | European Pat. Off. |
| 0271585 | 6/1988 | European Pat. Off. |
| 2852821 | 4/1980 | Fed. Rep. of Germany ........ 901/15 |
| 8301407 | 4/1983 | PCT Int'l Appl. |
| 0404897 | 12/1984 | PCT Int'l Appl. |
| 8700789 | 2/1987 | PCT Int'l Appl. |
| 1573593 | 8/1980 | United Kingdom |
| 2115781 | 9/1983 | United Kingdom |

OTHER PUBLICATIONS

Catalogue of Alvey Inc., "Alvey New Generation, Robotic Palletizers".

Primary Examiner—Frank E. Werner
Assistant Examiner—James Eller
Attorney, Agent, or Firm—Sughrue, Mion, Zinn, Macpeak & Seas

[57] ABSTRACT

An industrial robot apparatus for palletizing or depalletizing loads onto or from a pallet, having a robot body, a slider supported on the robot body and movable in a first direction, a mechanism for moving the slider, a first arm provided on one end of the slider and rotatable parallel to a plane perpendicular to the first direction, a first motor for rotating the first arm, a second arm provided on a distal end of the first arm, rotatable parallel to the perpendicular plane and substantially extendible and retractable, a second motor for rotating the second arm, an extension/retraction mechanism for substantially extending and retracting the second arm, a wrist provided on a distal end of the second arm, rotatable parallel to the perpendicular plane and used to hold a load; and a third motor for rotating the wrist.

3 Claims, 3 Drawing Sheets

INDUSTRIAL ROBOT APPARATUS

BACKGROUND OF THE INVENTION

1. Field of the Invention

This invention relates generally to an industrial robot apparatus and, more particularly, to an industrial robot apparatus having a horizontal articulation type arm and used to palletize or depalletize corrugated cardboard boxes or the like onto or from a pallet.

2. Description of the Related Art

Referring to FIG. 4 which is a plane view of a conventional industrial robot apparatus of this kind, a robot body 1 has a vertical housing 2 and a slider 9 movable in the vertical direction along the housing 2. The slider 9 is moved by a servo motor 3 disposed on an upper end portion of the housing 2. A first articulation 16 capable of rotating by only an angle $\theta_1$ is attached to the projecting end of the slider 9. One end of a first arm 19 is connected to the articulation 16. A second articulation 17 capable of rotating by only an angle $\theta_2$ is connected to the other end of the first arm 19, and one end of a second arm 20 is connected to this articulation. A wrist 18 capable of rotating by only an angle $\alpha$ is connected to the other end of the second arm 20.

Conventionally, this horizontal articulation type of robot arm is used for palletizing or depalletizing corrugated cardboard boxes or the like.

However, as shown in FIG. 5, in a case where pallets 21a and 21b are disposed close to each other and where corrugated cardboard boxes 22 are palletized onto one 21b of the pallets, there is a risk of interference between the first arm 19 and corrugated cardboard boxes 22 on the other pallet 21a depending upon the manner of stacking the corrugated cardboard boxes 22. There is also a similar risk where the corrugated boxes 22 are depalletized.

The palletizing or depalletizing may therefore be difficult, and furthermore it is necessary to fix the robot arm operation in accordance with a right hand system or a left hand system.

SUMMARY OF THE INVENTION

In view of these problems, an object of the present invention is to provide an industrial robot apparatus capable of smoothly palletizing or depalletizing loads.

According to the present invention, there is provided an industrial robot apparatus including: a robot body; a slider supported on the robot body, the slider being movable in a first direction; a slider moving means for moving the slider; a first arm provided on one end of the slider, the first arm being rotatable parallel to a plane perpendicular to the first direction; a first rotation means for rotating the first arm; a second arm provided on a distal end of the first arm, the second arm being rotatable parallel to the perpendicular plane and substantially extendible and retractable; a second rotation means for rotating the second arm; an extension/retraction means for substantially extending and retracting the second arm; a wrist provided on a distal end of the second arm, the wrist being rotatable parallel to the perpendicular plane and for holding a load; and a third rotation means for rotating the wrist.

DESCRIPTION OF THE PREFERRED EMBODIMENT

An embodiment of the present invention will be described below with reference to the accompanying drawings.

Figure 1:
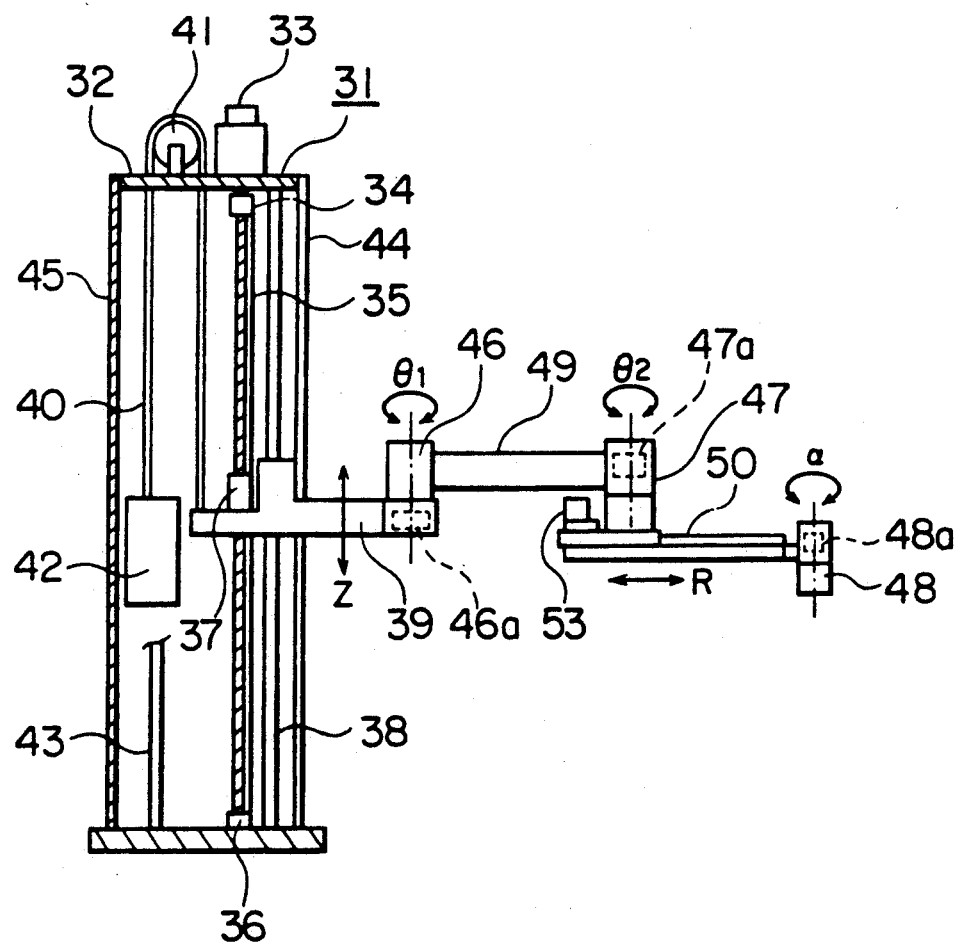
FIG. 1 is a cross-sectional view of an industrial robot apparatus which represents an embodiment of the present invention.

Referring to FIG. 1, a robot body 31 has a hollow housing 32 extending in the vertical direction. A ball screw 35 is disposed in the housing 32 along the longitudinal direction of the housing 32. The ball screw 35 is rotatably supported at its opposite ends by bearings 34 and 36 and is connected to a servo motor 33 disposed on an upper end portion of the housing 32. An LM (linear motion) guide 38 is fixed in the housing 32 while being positioned parallel to the ball screw 35. A slider 39 is disposed along the LM guide 38 so as to be movable in the vertical direction (direction Z). A nut 37 screwed around the ball screw 35 is fixed to the slider 39. One end of a chain 40 is connected to one end of the slider 39, and the other end of the chain 40 is connected to a counter weight 2, with an intermediate portion of the chain 40 wrapped on a pulley 41. A guide rail 43 is provided to guide the counter weight 42. The housing 32 has side covers 44 and 45.

The other end of the slider 39 projects outside the shaft 32, and a first articulation 46 capable of rotating parallel to a horizontal plane by only an angle $\theta_1$ is attached to the projecting end of the slider 39. One end of a first arm 49 is connected to the first articulation 46. A second articulation 47 capable of rotating parallel to a horizontal plane by only an angle $\theta_2$ is connected to the other end of the first arm 49. A second arm 50 is connected to the second articulation 47. A wrist 48 capable of rotating parallel to a horizontal plane by only an angle $\alpha$ is connected to the distal end of the second arm 50. Servo motors 46a and 47a for rotating the first and second arms 49 and 50 are incorporated in the first and second articulations 46 and 47. A servo motor 48a for rotating the wrist 48 is provided on the distal end of the second arm 50. The wrist 48 is used to hold a load such as a corrugated cardboard box.

Figure 2:
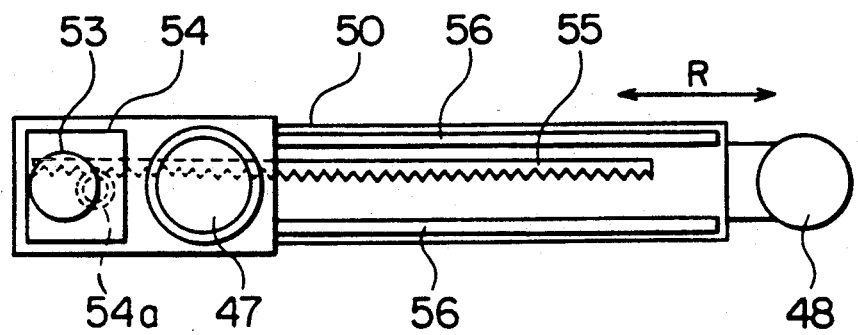
FIG. 2 is a plane view of the embodiment, showing essential portions of the same.
Figure 3:
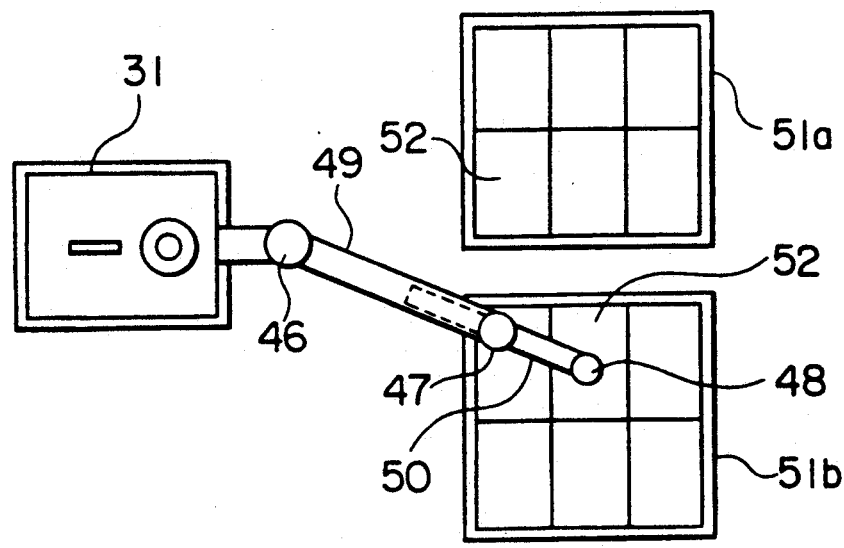
FIG. 3 is a plane view of the embodiment, showing the operation of the same.
Figure 4:
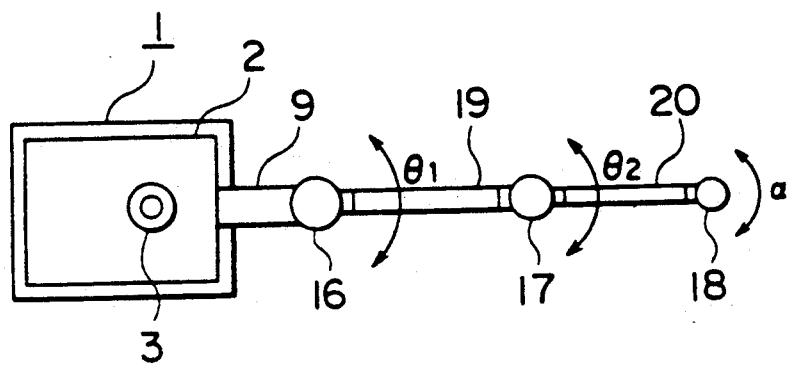
FIG. 4 is a plane view of a conventional industrial robot apparatus.
Figure 5:
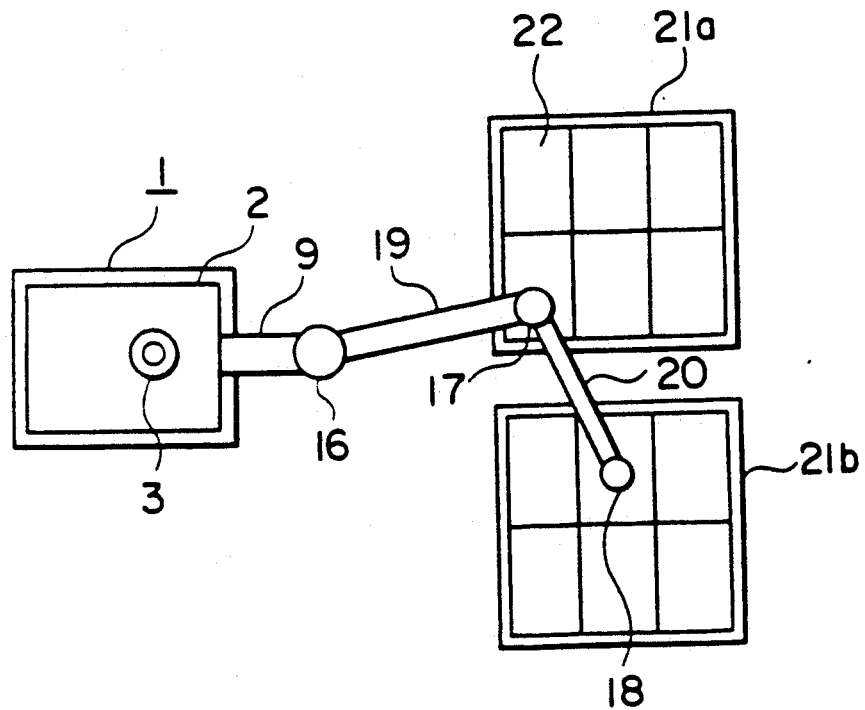
FIG. 5 is a plane view of the apparatus shown in FIG. 4, showing the operation of the same.

As shown in FIG. 2, a rack 55 is fixed on the second arm 50 so as to extend in the longitudinal direction of this arm, and a pair of LM guides 56 are provided on opposite sides of the rack 55. A servo motor 53 is provided on the second articulation 47, and a pinion 54a for meshing with the rack 55 is connected to the servo motor 53 through a speed reduction mechanism 54. By the driving force of the servo motor 53, the pinion 54a rotates and the second arm 50 extends by sliding in the longitudinal direction. That is, the second arm 50 can extend and retract substantially in the direction of an axis R.

During the operation of the thus-constructed horizontal articulation type robot arm, the slider 39 can be moved in the vertical direction by the driving of the servo motor 33, and each of the first arm 49, the second arm 50 and the wrist 48 can be moved by the driving of the corresponding one of the servo motors 46a, 47a and 48a. Also, the second arm 50 can be extended or retracted by the driving of the servo motor 53 if necessary. The wrist 48 can therefore be moved to a desired position by retracting the second arm 50 to a necessary extent under the first arm 49 without rotating the second articulation 47. Consequently, even in a case where two pallets 51a and 51b are disposed close to each other, it is possible to palletize or depalletize corrugated cardboard boxes 52 on the pallet 51a or 51b while avoiding interference between the corrugated cardboard boxes 52 placed on the pallet 51b or 51a and the robot members, i.e., the second articulation 47 and the first and second arms 49 and 50 without fixing the robot arm operation in accordance with a right hand system or a left hand system.

What is claimed is:

1. An industrial robot apparatus for palletizing loads on pallets or depalletizing said loads from said pallets, comprising:

a robot body;

a slider supported on said robot body, said slider being movable in a first direction;

slider moving means for moving said slider;

a first arm, a proximal end of said first arm provided on one end of said slider, said first arm being rotatable parallel to a plane perpendicular to the first direction;

first rotation means provided on said proximal end of said first arm for rotating said first arm;

a second arm, a proximal end of said second arm provided below a distal end of said first arm, said second arm being rotatable parallel to the perpendicular plane and substantially rectilinearly extendible and retractable parallel to the perpendicular plane;

second rotation means provided on said proximal end of said second arm for rotating said second arm;

extension/retraction means for substantially extending said second arm or retracting said second arm to a position under said first arm;

a wrist provided on a distal end of said second arm, said wrist being rotatable parallel to the perpendicular plane and movable to a desired position for holding one of said loads by extending or retracting said second arm; and third rotation means provided on said distal end of said second arm for rotating said wrist, such that said wrist is positionable to said desired position over one of said pallets without said robot apparatus interfering with adjacent palletized loads.

2. An apparatus according to claim 1, wherein said extension/retraction means includes a rack fixed on said second arm so as to extend along a longitudinal direction of said second arm, a pinion meshing with said rack, and a servo motor for rotating said pinion.

3. An apparatus according to claim 2, wherein said servo motor has a speed reduction mechanism.

* * * * *